(12) United States Patent
Liedtke et al.

(10) Patent No.: US 10,841,506 B2
(45) Date of Patent: Nov. 17, 2020

(54) METHOD AND ARRANGEMENT FOR ACQUIRING IMAGE DATA

(71) Applicant: Carl Zeiss Microscopy GmbH, Jena (DE)

(72) Inventors: Mirko Liedtke, Jena (DE); Jakob Haarstrich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 112 days.

(21) Appl. No.: 16/325,656

(22) PCT Filed: Aug. 14, 2017

(86) PCT No.: PCT/EP2017/070533
§ 371 (c)(1),
(2) Date: Feb. 14, 2019

(87) PCT Pub. No.: WO2018/033497
PCT Pub. Date: Feb. 22, 2018

(65) Prior Publication Data
US 2019/0208105 A1 Jul. 4, 2019

(30) Foreign Application Priority Data

Aug. 15, 2016 (DE) .................. 10 2016 215 177

(51) Int. Cl.
*G02B 21/06* (2006.01)
*H04N 5/235* (2006.01)
(Continued)

(52) U.S. Cl.
CPC ....... *H04N 5/2355* (2013.01); *G02B 21/0032* (2013.01); *G02B 21/0076* (2013.01);
(Continued)

(58) Field of Classification Search
CPC .. G02B 21/06; G02B 21/0076; G02B 21/016; G02B 21/0032; G01N 21/6458;
(Continued)

(56) References Cited

U.S. PATENT DOCUMENTS 5,216,484 A * 6/1993 Chao .................. G01J 3/1256
250/339.07
5,263,037 A * 11/1993 Trutna, Jr. ........... G02B 6/4203
372/102
(Continued)

FOREIGN PATENT DOCUMENTS

EP 1761071 A1 3/2007
EP 1879049 A1 1/2008
(Continued)

OTHER PUBLICATIONS

Notification of Transmittal of Translation of the International Preliminary Report on Patentability, Translation of International Preliminary Report on Patentability and Translation of Written Opinion of the International Searching Authority.
(Continued)

*Primary Examiner* — William R Alexander
*Assistant Examiner* — Tamara Y. Washington
(74) *Attorney, Agent, or Firm* — Duane Morris LLP

(57) ABSTRACT

A method and arrangement for acquiring image data, wherein a pixel area of a specimen to be imaged is illuminated in a plurality of illumination events with illumination light of a respective selected intensity, which intensities are different from one another. Subsequently, detection light emanating from the respective pixel area is acquired for each of the intensities as image data of a subpixel and resulting image data of the pixel area are determined from the number of acquired image data of the subpixels. According to the invention, the illumination events are triggered successively.

(Continued)

The image data of all subpixels of the pixel area are acquired before a further pixel area is illuminated.

5 Claims, 2 Drawing Sheets

(51) Int. Cl.
    *G02B 21/16*         (2006.01)
    *G02B 21/36*         (2006.01)
    *G02B 21/00*         (2006.01)
    *H04N 3/10*          (2006.01)

(52) U.S. Cl.
    CPC ........... *G02B 21/16* (2013.01); *G02B 21/367* (2013.01); *H04N 3/10* (2013.01)

(58) Field of Classification Search
    CPC ........ G02F 1/01; G02F 1/1313; G02F 1/0311; G02F 1/116; G02F 1/13306; G02F 1/13363; A61B 1/00096; A61B 1/00188; G03H 2001/0452; G06T 1/00; G05B 2219/45182; G03G 15/5087; G06F 16/50
    USPC ....................................................... 359/385
    See application file for complete search history.

(56) References Cited

U.S. PATENT DOCUMENTS

| | | | | |
|---|---|---|---|---|
| 5,377,003 | A * | 12/1994 | Lewis | G01J 3/2823 250/339.02 |
| 5,379,065 | A * | 1/1995 | Cutts | G01J 3/2823 348/269 |
| 5,528,368 | A * | 6/1996 | Lewis | G01J 3/2823 250/339.02 |
| 5,606,413 | A * | 2/1997 | Bellus | G01J 3/2823 356/326 |
| 6,353,673 | B1 * | 3/2002 | Shnitser | G06K 9/3241 382/103 |
| 6,614,031 | B2 * | 9/2003 | Engelhardt | G02B 21/0076 250/459.1 |
| 6,738,190 | B2 * | 5/2004 | Engelhardt | G02B 21/0032 359/368 |
| 7,133,130 | B2 * | 11/2006 | Storz | G01N 21/6428 356/317 |
| 7,316,904 | B1 * | 1/2008 | Farkas | G01N 21/6428 435/40.5 |
| 8,289,620 | B2 * | 10/2012 | Bobanovic | G02B 21/0044 359/368 |
| 8,358,419 | B2 * | 1/2013 | Walters | G01R 3/00 356/445 |
| 8,644,911 | B1 * | 2/2014 | Panasyuk | G01J 3/28 600/473 |
| 9,500,846 | B2 * | 11/2016 | Betzig | G01N 21/6458 |
| 9,651,774 | B2 * | 5/2017 | Fujiwara | A61B 1/00006 |
| 10,051,240 | B2 * | 8/2018 | Betzig | H04N 7/18 |
| 10,078,203 | B2 * | 9/2018 | Mori | G02B 21/002 |
| 10,247,672 | B2 * | 4/2019 | Betzig | G01N 21/6428 |
| 2005/0209012 | A1 | 9/2005 | Jouppi | |
| 2010/0208339 | A1 | 8/2010 | Kleppe et al. | |
| 2016/0299326 | A1 * | 10/2016 | Eggert | G02B 21/367 |

FOREIGN PATENT DOCUMENTS

| | | |
|---|---|---|
| EP | 2859837 A1 | 4/2015 |
| WO | 2007036304 A2 | 4/2007 |
| WO | 2011038815 A1 | 4/2011 |
| WO | 2015091634 A1 | 6/2015 |

OTHER PUBLICATIONS

Bell, A.A., et al.; "High Dynamic Range Images as a Basis for Detection of Argyrophilic Nucleolar Organizer Regions Under Varying Stain Intensities": Proceedings of IEEE International Conference on Image Processing, ICIP 2006; 2541-2544.

* cited by examiner

METHOD AND ARRANGEMENT FOR ACQUIRING IMAGE DATA

RELATED APPLICATIONS

The present application is a U.S. National Stage application of International PCT Application No. PCT/EP2017/070533 filed on Aug. 14, 2017 which claims priority benefit of German Application No. DE 10 2016 215 177.0 filed on Aug. 15, 2016, the contents of each are incorporated by reference in their entirety.

FIELD OF THE INVENTION

The invention relates to a method and an arrangement for acquiring images in accordance with the preambles of the independent claims.

BACKGROUND OF THE INVENTION

For the pixel-by-pixel acquisition of image data, use is made, for example, of methods for dynamic image recording, in which a plurality of recordings of a specimen or of a specimen area are conventionally illuminated with different illumination intensities, a detection light emanating from the specimen is detected and the image data acquired in this way are offset against one other.

Both dark and light image areas can be measured separately with a good signal-to-noise ratio by way of multiple single image recording with different exposure times. Said image areas can then be computed to form an overall image with enhanced dynamics, in which both light and dark areas are rendered with a high contrast (known as high-dynamic-range imaging; HDRI; A. Bell et al.: "High Dynamic Range Images as a Basis for Detection of Argyrophilic Nucleolar Organizer Regions Under Varying Stain Intensities", Proceedings of IEEE International Conference on Image Processing, ICIP 2006, 2541-2544). Instead of different exposure times, different excitation intensities can be used in the case of excited fluorescence as detection light. In the case of sequential or multiple single image recording, an illumination interval, that is to say a total time during which a pixel area is illuminated, is made up of illumination events that are separate from one another. Image data of further pixel areas are acquired between the individual illumination events of a pixel area.

In other known methods, an exposure intensity is regulated depending on detected signal strengths of the detection light. When the so-called CLEM method (controlled light exposure microscopy) is used, blanking is performed depending on acquired signal strengths of the detection light.

Although methods using sequential recording make it possible to measure both dark and light image areas separately with a good signal-to-noise ratio and to compute said image areas to form an overall image with enhanced dynamics, these methods are complex and slow.

As an alternative to sequential recording of individual images, EP 1 761 071 A1, for example, discloses simultaneous recording of single images of different contrast range by means of asymmetrical optical beam splitting. Inevitably, however, this requires division of the light signal over a plurality of channels and a plurality of optoelectronic detectors, which represent additional sources of noise. The signal-to-noise ratio (SNR) is further reduced by way of the signal strengths in the individual channels, which signal strengths are lower due to the division.

A further method is described in WO 2011/038815 A1. To propose an alternative for the complex and slow sequential recording, to generate the overall image for various specimen areas, one of a plurality of evaluation methods (SPC1 ADC, 2D-PC) is selected depending on one of the result signals and/or depending on an intermediate result signal of one of a plurality of parallel evaluation channels. Area-specific selection from various signal evaluations makes it possible to use the respective signal evaluation with the dynamic range optimum for the relevant specimen area. The resulting image thereby gains an enhanced dynamic range, resulting from the union of the dynamic ranges of the individual image elements.

US 2010/0208339 A1 discloses a method for operating a microscope, in which excitation light is directed onto different points of a specimen. In this case, an intensity of the excitation light in each of these points varies and an intensity of the detection light in at least one spectral range is detected quantitatively and for each point. The intensity and/or the spectral composition of the excitation light is regulated automatically by means of a regulation system. Previously compiled measurement data of an intensity of the detection light serve as the base data of the regulation, wherein an intensity integrated over the duration of an exposure event does not exceed a prescribed value. In this procedure, also referred to as DIM, an exposure intensity is regulated during an exposure period.

SUMMARY OF THE INVENTION

The invention is based on the object of proposing an alternative method for acquiring image data that is also easy to implement. The invention is also based on the object of proposing an alternative arrangement for acquiring image data.

The object is achieved with respect to the method by way of the features of claim 1. The object is achieved with respect to the arrangement by way of the features of claim 7. Advantageous configurations of the invention are the subject matter of the dependent claims.

In the proposed method for acquiring image data, a pixel area of a specimen to be imaged is illuminated repeatedly, at least twice, with illumination light of a respectively different intensity. As a result of the illumination, detection light emanating from the pixel area is acquired for each illumination event as image data of a subpixel. Resulting image data of the pixel area are determined from the number of acquired image data of the subpixels of the relevant pixel area.

In the method of the invention, the illumination events for a pixel area are triggered successively and the image data of all subpixels of the pixel area are acquired before a further pixel area is illuminated.

A pixel (image element) is understood to mean the smallest unit from which an image is composed. In the present description, a pixel area of the specimen to be imaged is intended to be an area of the specimen that is imaged at a specific magnification in a pixel, that is to say corresponds to a pixel of the image.

Since each pixel area is illuminated repeatedly before the resulting image data of the relevant pixel area and hence of the relevant pixel are determined, for example calculated, from the image data acquired during the respective illuminations events, image data associated with each pixel area of a respective intensity are present.

Any illumination of the pixel area with illumination light of one the selected intensities constitutes an illumination event. The pixel areas illuminated with a respective selected intensity are referred to as subpixels. An illumination interval (known as pixel dwell time) is composed of at least two illumination events and their respective time periods, respectively. For simplification, a subpixel is subsequently equated with an illumination event. An illumination interval is therefore composed of at least two subpixels and their respective time periods, respectively.

Light that is used for illumination is at least proportionately reflected by the specimen as detection light and/or by way of which molecules located in the specimen are excited to emit light, for example fluorescent light, as detection light. The illumination light is advantageously laser light, in particular when the pixel areas are sampled in a punctiform manner (scanning).

The detection light can therefore be fluorescent light and/or reflected spectral portions of the illumination light.

The method according to the invention differs from known methods in that the acquisition of the image data of a pixel area is fully concluded within the shortest possible time. This advantageously prevents a pixel area from being struck exactly, for example in the case of sequential recording thereof in the case of renewed illumination and/or the properties of the pixel area already having changed based on time before renewed illumination and acquisition of the image data takes place. The latter is relevant, in particular, in biological specimens. Advantageously, detectors used for detecting the detection light are protected and the load on the specimen is significantly reduced by means of the method according to the invention. Furthermore, in the case of a quasi-modulated illumination of the specimen, fluorophores possibly present in and/or on the specimen are advantageously influenced.

The statement that the image data of all subpixels of the pixel area are acquired before a further pixel area is illuminated refers to a used illumination device or an illumination beam path. If, in possible configurations of the method, a plurality of illumination devices and/or a plurality of illumination beam paths are used, for example for multispot sampling of the specimen, all subpixels of a pixel area are illuminated and acquired by means of each illumination device or each illumination beam path before a next pixel area is illuminated.

In possible configurations of the method, the successive illumination events are generated either with continuously increasing or with continuously decreasing intensities. By way of this configuration of the method, it is advantageously possible to utilize a temporal rise response of a switching element used to carry out the method by virtue of selecting the increasing or decreasing intensities based on the known temporal rise response of the switching element.

In a possible configuration of the method, the intensities of successive illumination events or subpixels of a pixel area are selected based on a step function, by virtue of function values of the step function being selected. In this case, function values can advantageously be selected for each of the steps of the step function, since these are constant over a time period.

Control commands are generated based on the selected function values of the step function, said control commands being used to actuate the illumination device or the illuminations devices.

It is very advantageous here if the steps of the step function correspond in terms of their temporal sequence and duration to the illumination events or subpixels. This is significant, in particular, when the function values are selected dynamically, that is to say periodically or continuously. In this case, control commands can be generated periodically or continuously and/or it is checked periodically or continuously if the selected function values are within permissible tolerance limits.

If the illumination events are of very short duration, i.e. short pixel dwell times are realized, the steps are accordingly incrementally small. In such cases, sinusoidal functions can be used, wherein a resulting non-linearity of the illumination and of the intensities during an illumination event or subpixel in a subsequent evaluation of the image data has to be taken into account.

Therefore, in a further configuration of the method, the intensities of successive illumination events of a pixel area can be selected based on a sinusoidal function, by virtue of function values of the sinusoidal function being selected, control commands being generated based on the selected function values of the sinusoidal function and an illumination device being actuated by way of the generated control commands. This configuration of the method makes possible, for example, modulation frequencies of 500 kHz for illumination intervals of 1 µs (microsecond), when, for example, an AOTF or an AOTF crystal is used as modulating switching element.

If other methods are selected in further configurations of the method, other modulation frequencies that can be higher or lower than 500 kHz are also possible. Further methods employ, for example, directly modulating light sources, in particular lasers, acousto-optic modulators (AOM), electro-optic modulators (EOM) or acousto-optic beam splitters (AOBS).

The step functions or the sinusoidal function represent actuation curves or actuation functions. The control commands are commands in a suitable machine language.

For execution of the method, a switching element is advantageously used to control the illumination events, the temporal rise response of said switching element being able to be represented by a step function or a sinusoidal function.

Such a switching element can be, for example, an AOTF (acousto-optic filter), an EOM (electro-optic modulator), an AOBS (acousto-optic beam splitter) or directly modulating laser.

The object is achieved in terms of the arrangement for acquiring image data by way of an arrangement, which has an illumination device for the repeated illumination of the pixel area of the specimen to be imaged with illumination light of respectively different intensity. In addition, the arrangement has a detector for detecting detection light subsequently emanating from the pixel area for each illumination event as image data of the subpixel as well as a control unit for actuating the illumination device. The control unit is used and designed to illuminate the respective pixel area with the respective selected intensity of the illumination light during an illumination event or subpixel.

The control unit of the arrangement is configured in such a way that the respective selected and used intensities are selected based on a prescribed function by virtue of function values of the function being selected, control commands being generated based on the selected function values of the function and the generated control commands being provided to actuate the illumination device.

The control commands can be generated by a generator, which is part of the control unit or is joined thereto in a manner suitable for the exchange of data.

In a further configuration of the arrangement, the control unit has a switching element, the temporal rise response of which can be represented by a step function or by a sinusoidal function. A function can be represented, for example, graphically or by means of a mathematical calculation specification. The switching element is advantageously an AOTF.

The arrangement according to the invention can advantageously be present in a laser-scanning microscope.

BRIEF DESCRIPTION OF THE FIGURES

The invention is explained in more detail below on the basis of exemplary embodiments and figures. In the figures.

DETAILED DESCRIPTION OF THE EMBODIMENTS

Figure 1:
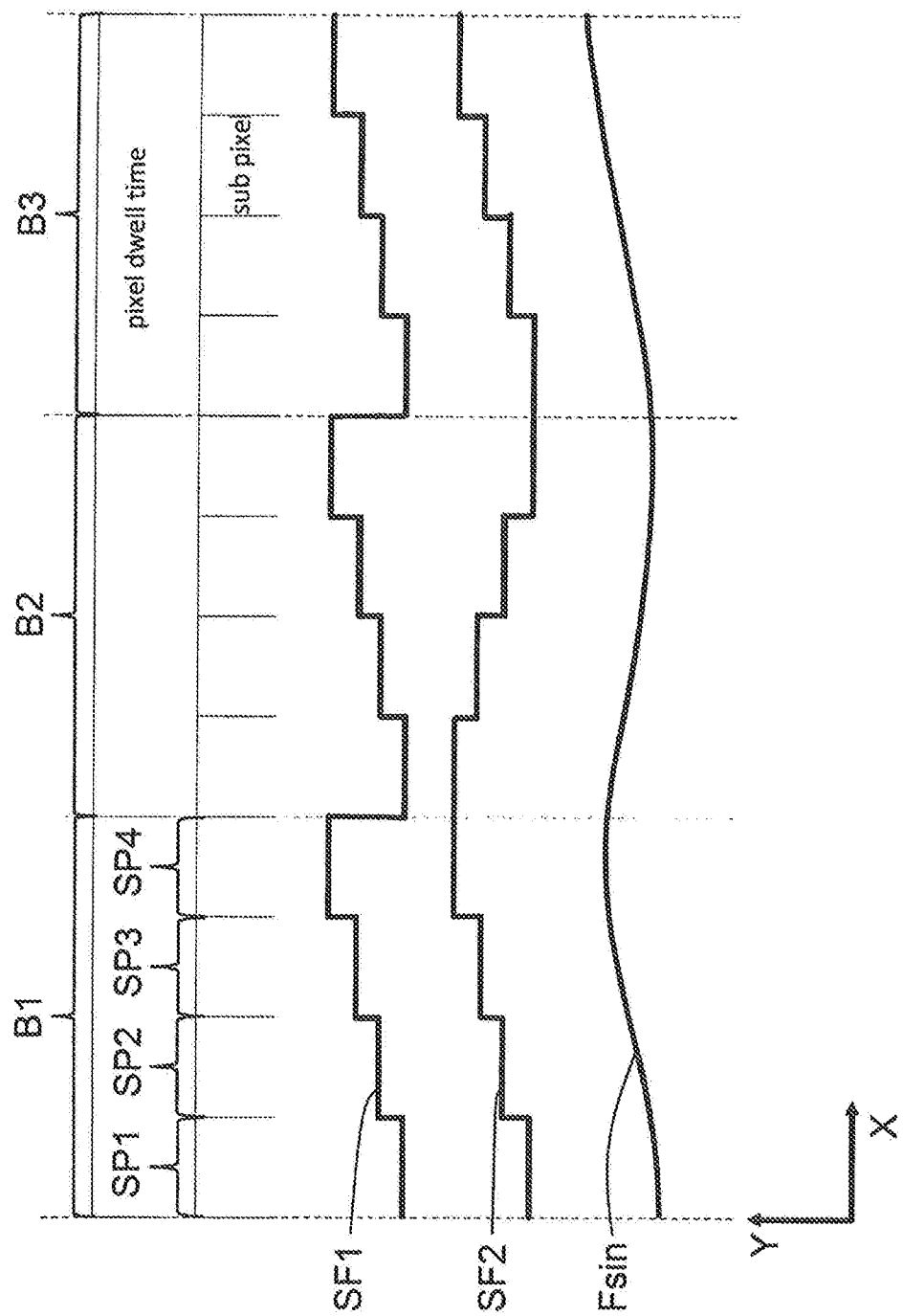
FIG. 1 is a schematic illustration of the three successive illumination events, the subpixels thereof and examples of two step functions and a sinusoidal function.

FIG. 1 schematically illustrates three successive illumination intervals B1 to B3 in a graph with an x axis as a time axis. During each illumination interval B1 to B3 (also known as pixel dwell time), a pixel area PB is illuminated with illumination light BL (see FIG. 2) with four respective different intensities over equal durations, which for the first illumination interval B1 are denoted the first to fourth subpixel SP1 to SP4.

FIG. 1 illustrates by way of example an overview of three possible types of functions that can be used in a method according to the invention. The function values of the functions are plotted in the direction of the y axis Y.

A first step function SF1 rises in steps over the duration of an illumination interval B1 to B3, wherein each step corresponds to a respective subpixel SP1 to SP4 of the relevant illumination interval B1 to B3 with respect to the temporal position and duration thereof. At the end of each illumination interval B1 to B3, the first step function SF1 jumps back to a starting value. The first step function SF1 therefore increases during each illumination interval B1 to B3 in discrete steps.

A second step function SF2 rises in steps over the duration of the first illumination interval B1, decreases in steps over the duration of the second illumination interval B2 and rises again in steps over the duration of the third illumination interval B3.

A sinusoidal function Fsin passes through half an oscillation period per illumination interval B1 to B3.

Figure 2:
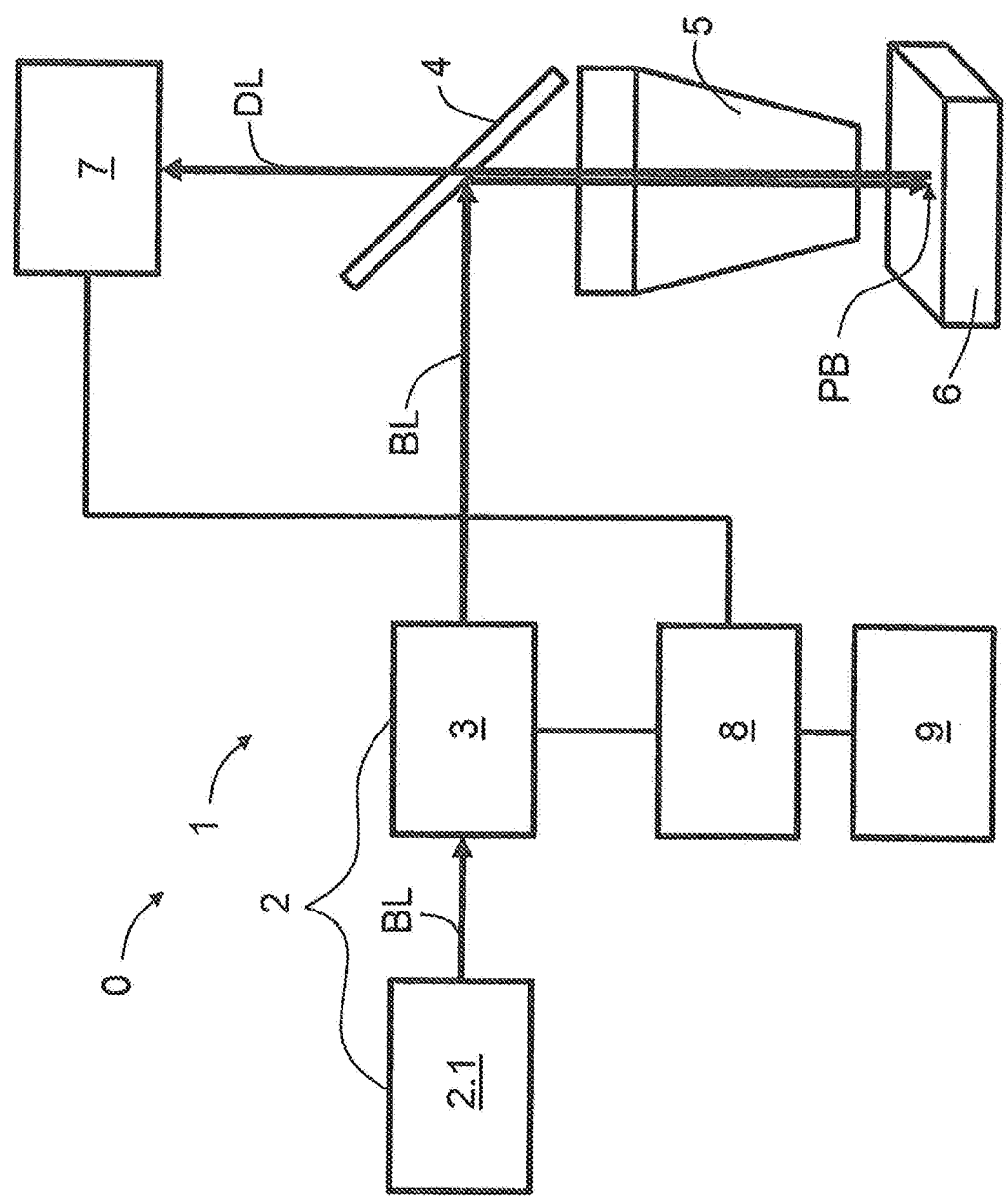
FIG. 2 is a schematic illustration of an exemplary embodiment of a microscope with an arrangement for acquiring image data.

An exemplary embodiment of an arrangement 1 for image acquisition is schematically shown in FIG. 2. The arrangement 1 is part of a microscope 0 (not illustrated in any more detail) and comprises an illumination device 2 for the repeated illumination of a pixel area PB of a specimen 6 to be imaged with illumination light BL of respectively different intensity. The illumination device 2 comprises a light source 2.1 for laser light as well as a switching element 3 for the controlled influencing of the intensity of the illumination light BL. The intensity of the illumination light BL is modulated in the switching element 3, which in this case is formed as an AOTF. The modulated illumination light BL is incident on a color splitter in the form of a semitransparent mirror 4 and is reflected onto the specimen 6 through an objective 5 in the pixel area PB by means of the semitransparent mirror 4. In the illuminated pixel area PB, a detection light DL is generated by the effect of the illumination light BL. For example, molecules of the specimen 6 are excited to emit fluorescence radiation as detection light DL. The detection light DL travels through the objective 5 to the semitransparent mirror 4, which is transmissive for the wavelength of the detection light DL. The transmitted detection light DL is detected by way of a detector 7.

The switching element 3 and the detector 7 are connected to a control unit 8 by means of data channels (shown schematically) and can be actuated thereby. In addition, the detector 7 can be read out by the control unit 8.

To be able to transmit the data read out by the detector 7 on a computation and storage unit 9, the control unit 8 is connected to the computation and storage unit 9.

In further possible embodiments, the control unit 8 is connected in addition or as an alternative to the light source 2.1 in a manner suitable for the transmission of data and control commands.

Such connections or data channels are implemented, for example, through cables, conductors, radio and/or light transmission paths.

To carry out the method according to the invention, one of the functions SF1, SF2 and Fsin shown in FIG. 1 is selected and made available to the control unit 8. In addition, the fact that image data of four subpixels SP1 to SP4 of equal length is intended to be determined for each illumination interval B1 to B3 is set in advance.

The further explanation refers by way of example to the first step function SF1.

The control unit 8 is configured in such a way that the intensities are selected based on the prescribed first step function SF1 by virtue of function values of the first step function SF1 being selected. The function values (y axis Y) plotted over time (x axis X) represent the intensity of the illumination light BL associated with a point in time.

In the exemplary embodiment, all function values of the first step function SF1 are selected dynamically, that is to say the function values are determined continuously over time based on the first step function SF1, for example are calculated or read out. Each of the selected function values is translated into a command, which is suitable for the actuation of the switching element 3. The generated control commands are provided to actuate the illumination device 2, in the exemplary embodiment in particular to actuate the switching element 3, and the illumination device 2 is actuated using said control commands.

During the first illumination interval B1, a pixel area PB over the period of the first subpixel SP1 is illuminated with illumination light BL of a first intensity, wherein the first intensity is given by the function value of the step of the first step function SF1 corresponding in terms of time to the first subpixel SP1. The detection light DL caused due to the illumination light BL with the first intensity in the pixel area PB is collected by means of the objective 5 and deflected onto the detector 7, by way of which the detection light DL is detected in the form of at least one measurement value (image data) and this is stored in a manner associated with the pixel area PB and the first subpixel SP1.

The method is also carried out for each of the subpixels SP2 to SP4 as described above. Image data of the pixel area PB resulting from the image data of the subpixels SP1 to SP4 are determined at the end of the first illumination event B1.

Storing the image data of the subpixels SP1 to SP4 can also be carried out in the control unit 8, which can also be configured as an evaluation unit.

The resulting image data are then determined for further pixel areas PB with respect to the illumination intervals B2 and B3, illustrated by way of example, by way of the method according to the invention. An image file of the specimen 6 can be compiled from the resulting image data of a multiplicity of pixel areas PB as a result. These steps can also be performed by means of the control unit 8.

To minimize amounts of data, for example, of an image file that is transmitted to the computation and storage unit 9, the method according to the invention is as local as possible, in particular by means of the control unit 8 configured and equipped for this purpose.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

0 Microscope
1 Arrangement
2 Illumination device
2.1 Light source
3 Switching element
4 Semitransparent mirror
5 Objective
6 Specimen
7 Detector
8 Control unit
9 Computation and storage unit
SF1 First function
SF2 Second function
Fsin Sinusoidal function
BL Illumination light
DL Detection light
PB Pixel area
SP1 First subpixel
SP2 Second subpixel
SP3 Third subpixel
SP4 Fourth subpixel
B1 to B3 First to third illumination interval
X X axis
Y Y axis

What is claimed is:

1. A method for acquiring image data, comprising
illuminating a pixel area of a specimen to be imaged in a plurality of illumination events with illumination light of a respective selected intensity, which intensities are different from one another,
subsequently acquiring detection light emanating from the respective pixel area for each of the intensities as image data of a subpixel, and
determining resulting image data of the pixel area from the number of acquired image data of the subpixels,
wherein: said illumination events being triggered successively; and said image data of all subpixels of the pixel area being acquired before a further pixel area is illuminated, and
wherein: the intensities of successive illumination events of a pixel area are selected based on a step function, by virtue of function values of the step function being selected, control commands being generated based on the selected function values of the step function and an illumination device being actuated by way of the generated control commands.

2. The method as claimed in claim 1, wherein the successive illumination events are generated either with continuously increasing or with continuously decreasing intensities.

3. The method as claimed in claim 1, wherein the intensities of successive illumination events of a pixel area are selected based on a sinusoidal function, by virtue of function values of the sinusoidal function being selected, control commands being generated based on the selected function values of the sinusoidal function and an illumination device being actuated by way of the generated control commands.

4. A method for acquiring image data, comprising
illuminating a pixel area of a specimen to be imaged in a plurality of illumination events with illumination light of a respective selected intensity, which intensities are different from one another,
subsequently acquiring detection light emanating from the respective pixel area for each of the intensities as image data of a subpixel, and
determining resulting image data of the pixel area from the number of acquired image data of the subpixels,
wherein: said illumination events being triggered successively; and said image data of all subpixels of the pixel area being acquired before a further pixel area is illuminated, and
generating the illumination events by use of a switching element, the temporal rise response of said switching element being able to be represented by a step function or a sinusoidal function.

5. The method as claimed in claim 4, wherein said switching element to generate the illumination events is an acousto-optic tunable filter.

* * * * *